US007971961B2

(12) United States Patent
Smythies

(10) Patent No.: US 7,971,961 B2
(45) Date of Patent: Jul. 5, 2011

(54) FORMING IMAGES WITH STITCHED SWATHS

(75) Inventor: Douglas C. Smythies, Coquitlam (CA)

(73) Assignee: Eastman Kodak Company, Rochester, NY (US)

( * ) Notice: Subject to any disclaimer, the term of this patent is extended or adjusted under 35 U.S.C. 154(b) by 612 days.

(21) Appl. No.: 12/134,514

(22) Filed: Jun. 6, 2008

(65) Prior Publication Data

US 2009/0303268 A1 Dec. 10, 2009

(51) Int. Cl.
 *B41J 2/15* (2006.01)
 *B41J 2/145* (2006.01)
(52) U.S. Cl. .......................................................... 347/41
(58) Field of Classification Search ................. 347/9, 12, 347/15, 40, 41, 43
 See application file for complete search history.

(56) References Cited

U.S. PATENT DOCUMENTS

| 5,619,233 | A | 4/1997 | Harrington |
| 6,285,488 | B1 | 9/2001 | Sandstrom |
| 6,540,315 | B1 | 4/2003 | Nystrom et al. |
| 7,023,526 | B2 | 4/2006 | Latypov et al. |
| 7,025,437 | B2* | 4/2006 | Vanhooydonck et al. ...... 347/41 |
| 2010/0014780 | A1* | 1/2010 | Kalayeh ........................ 382/284 |

FOREIGN PATENT DOCUMENTS

EP 0 894 633 A 2/1999

* cited by examiner

*Primary Examiner* — Thinh H Nguyen
(74) *Attorney, Agent, or Firm* — Nelson Adrian Blish

(57) ABSTRACT

A method for forming an image on recording media includes providing a support adapted to receive the recording media; providing a controller programmed for controlling a print head comprising a plurality of individually controllable marking elements to form the image on the recording media in accordance with image data corresponding to the image; and operating the print head to form a plurality of sub-images on the recording media, wherein the plurality of sub-images are stitched together to form the image with a stitching pattern that is determined based at least one a size of a portion of a feature of the image that can be formed in each sub-image of the plurality of sub-images.

26 Claims, 6 Drawing Sheets

FORMING IMAGES WITH STITCHED SWATHS

CROSS REFERENCE TO RELATED APPLICATIONS

Reference is made to commonly-assigned copending U.S. patent application Ser. No. 12/134,529, filed, entitled FORMING IMAGES WITH MINIMUM FEATURE SIZES, by Douglas Smythies, the disclosure of which is incorporated herein.

FIELD OF THE INVENTION

The invention relates to marking systems used to form images on recording media with a plurality of marking elements. The invention may be applied to printing apparatus, for example.

BACKGROUND OF THE INVENTION

Various marking systems are used to form images on recording substrates. For example, images can be formed on a recording media by mounting the recording media on a support and operating a print head comprising a plurality of marking elements to form the images on the media. In such systems, images can be formed by various processes. For example, the marking elements can be operable for emitting radiation beams to form an image on the recording media. In other examples, the marking elements can be operated to emit an image forming material onto the recording media to form an image thereon. For example, in various inkjet applications various marking elements are used to emit streams of drops of image forming material to form images on various recording media. Typically, image forming material comprises a fluid state in inkjet processes. Inkjet processes can include continuous inkjet and drop-on-demand inkjet processes, for example.

Various image features are formed on a recording media by combining image elements (i.e. also known as pixels or dots) into arrangements representative of the features. It is a common desire to form high quality images with reduced levels of artifacts. In particular, the visual quality of the formed image features is typically dependant on the visual characteristics of the formed imaged elements themselves. For example, one important characteristic is the contrast between an image element and surrounding regions of the recording media upon which an image is not formed. Poor contrast can lead to the formation of various image features whose edges lack sharpness or are otherwise poorly defined.

Increased productivity requirements have lead to the use of print heads with ever increasing numbers of marking elements. Despite these larger numbers however, for many applications it still becomes necessary to merge a plurality of sub-images to create a desired image. Merging sub-images without artifacts along their merged borders, or in regions where the sub-images may overlap, is desirable. Banding refers to an artifact that may appear as regular or random patterns of density variations. Typically, banding can occur in the regions where various sub-images are merged. Artifacts such as banding can be caused by placement errors of the image elements on the recording media or by visual characteristic variations among the image elements.

Various factors can adversely affect the placement requirements and/or the visual characteristics of formed image elements. Errors in a required placement can arise from different causes including spatial misalignment between the print head and the recording media during the formation of the image elements. Operating variations among the various marking elements (e.g. radiation beam intensity variations) can lead to visual characteristics variations among the image elements (e.g. density variations). The visual characteristics and/or the placement requirements of formed image elements can also vary as function of the image data that is used to control the formation of the image elements.

There remains a need for effective and practical methods and systems that can permit the formation of an image from a plurality of sub-images.

There remains a need for effective and practical methods and systems that can adjust the formation of sub-images as a function of the image data corresponding to the sub-images.

There remains a need for effective and practical methods and systems that can reduce data-dependant artifacts in formed images.

SUMMARY OF THE INVENTION

A method for forming an image on recording media includes providing a support adapted to receive the recording media; providing a controller programmed for controlling a print head comprising a plurality of individually controllable marking elements to form the image on the recording media in accordance with image data corresponding to the image; and operating the print head to form a plurality of sub-images on the recording media, wherein the plurality of sub-images are stitched together to form the image with a stitching pattern that is determined based at least one a size of a portion of a feature of the image that can be formed in each sub-image of the plurality of sub-images.

BRIEF DESCRIPTION OF THE DRAWINGS

Embodiments and applications of the invention are illustrated by the attached non-limiting drawings. The attached drawings are for purposes of illustrating the concepts of the invention and may not be to scale.

DETAILED DESCRIPTION OF THE INVENTION

Throughout the following description specific details are presented to provide a more thorough understanding to persons skilled in the art. However, well-known elements may not have been shown or described in detail to avoid unnecessarily obscuring the disclosure. Accordingly, the description and drawings are to be regarded in an illustrative, rather than a restrictive sense.

Figure 1:
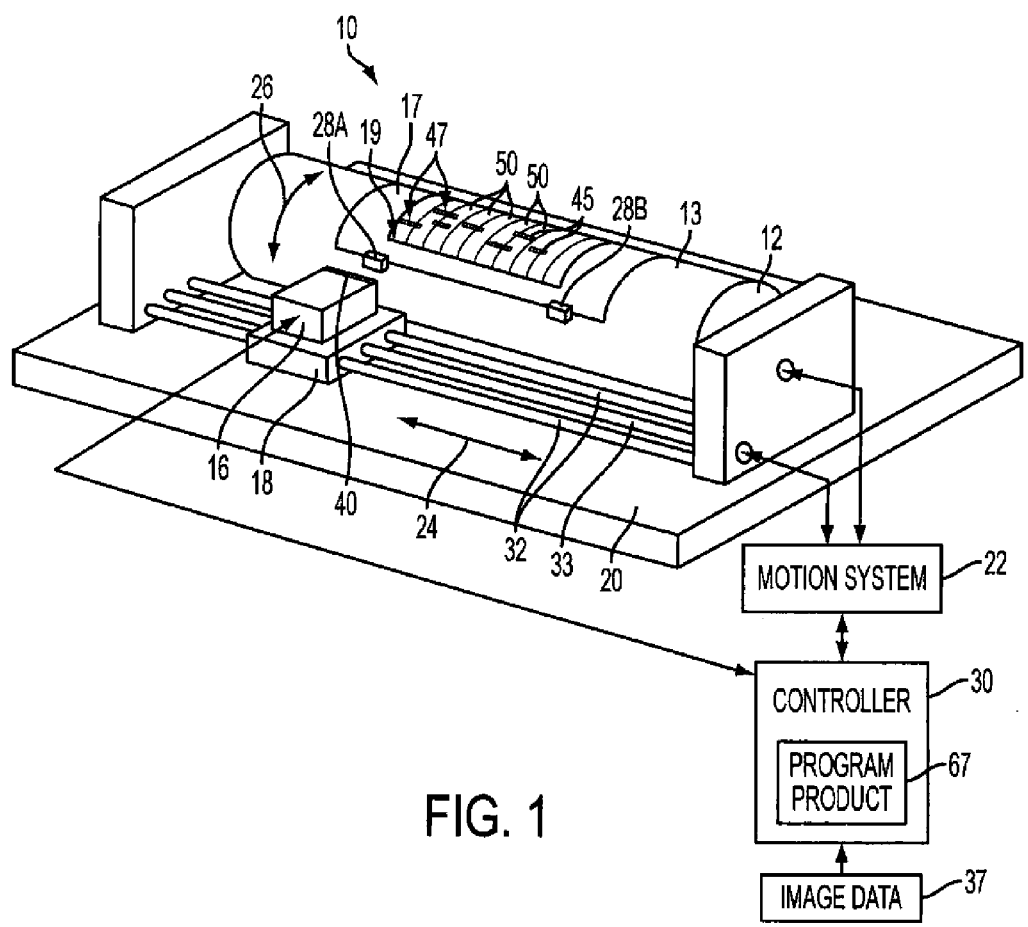
FIG. 1 is a schematic perspective view of an imaging apparatus as per an example embodiment of the invention.

FIG. 1 schematically shows an apparatus 10 for forming an image 19 on a recording media 17 as per an example embodiment of the invention. Apparatus 10 includes a media support 12, which in this example embodiment includes an external drum configuration. Other examples of embodiments of the invention can include other forms of media supports which can include internal drum configurations or flat surface configurations. Recording media 17 is supported on a surface 13 of media support 12. One or more portions of recording media 17 are secured to surface 13 by clamping members 28A and 28B. Other example embodiments of the invention can secure recording media 17 to media support 12 by additional or alternative methods. For example, a surface of recording media 17 can be secured to surface 13 by various methods including providing a low pressure source (e.g. suction) between the surfaces.

Apparatus 10 includes print head 16 which is movable with respect to media support 12. In this example embodiment of the invention, print head 16 is mounted on movable carriage 18. Media support 12 rotates with respect to support 20 and carriage 18 is moved with respect to support 20 in a manner in which print head 16 is moved along a path aligned with a rotational axis of the drum (i.e. media support 12). Motion system 22 is used to provide relative movement between print head 16 and media support 12. Motion system 22 (which can include one or more motion systems) includes any suitable drives, transmission members, and/or encoders/sensors needed for the required movement. In this example embodiment of the invention, motion system 22 is used to move media support 12 along a path aligned with main-scan axis 26 while moving print head 16 along a path aligned with sub-scan axis 24. Guide system 32 is used to guide carriage 18 which is moved under the influence of transmission member 33. In this example embodiment of the invention, transmission member 33 includes a precision lead screw. Those skilled in the art will realize that other forms of motion are also possible. For example, in some cases print head 16 can be stationary while media support 12 is moved. In other cases, media support 12 is stationary and print head 16 is moved. One or both of print head 16 and media support 12 can reciprocate along corresponding paths. Separate motion systems can also be used to operate different systems within apparatus 10.

Controller 30, which can include one or more controllers is used to control one or more systems of apparatus 10 including, but not limited to, various motion systems 22 used by media support 12 and carriage 18. Controller 30 can also control media handling mechanisms that can initiate the loading and unloading of recording media 17 to and from media support 12. Controller 30 can also provide image data 37 to print head 16 and control print head 16 to form images in accordance with this data. Various systems can be controlled using various control signals and by implementing various methods. Controller 30 can be configured to execute suitable software and can include one or more data processors, together with suitable hardware, including by way of non-limiting example: accessible memory, logic circuitry, drivers, amplifiers, A/D and D/A converters, input/output ports and the like. Controller 30 can comprise, without limitation, a microprocessor, a computer-on-a-chip, the CPU of a computer or any other suitable microcontroller.

Print head 16 includes plurality of marking elements 40. The plurality of marking elements 40 can be arranged in various configurations including various array configurations. An array of marking elements 40 can include a one dimensional or a two dimensional array of the marking elements. Each of the marking elements 40 is controllable to form an image element 45 on recording media 17 in accordance with image information provided by image data 37. As used herein, image element refers to a single unit element of image that can be formed on recording media 17, and is also known in the image-forming arts as a "pixel" or "dot". In the present invention, various image elements 45 will be combined with other image elements 45 to form various image features 47. Image elements 45 can be combined to form various patterns of image elements 45 including halftone patterns, stochastic patterns and hybrid patterns (i.e. patterns that include halftone and stochastic patterns).

Marking elements 40 can be controlled to form images on recording media 17 by different methods. For example, in various inkjet applications, marking elements 40 can include various nozzle structures that are operable for emitting drops of image forming material on a surface of recording media 17. Each drop that is transferred to recording media 17 can form a corresponding image element 45. Image forming materials can include: colorants, dye based compositions, pigment based compositions, photo-sensitive compositions and thermo-sensitive compositions, for example. In this illustrated embodiment, marking elements 40 are controlled to emit radiation beams (not shown) to form corresponding image elements 45. Radiation beams can be emitted by various methods. For example, in this illustrated embodiment print head 16 includes a radiation source such as a laser (not shown) which directs radiation onto a spatial light modulator (also not shown). The channels of the spatial light modulator are selectively controlled to transform the radiation into a plurality of radiation beams. Various optical elements (not shown) project the radiation beams onto recording media 17 to form corresponding image elements 45.

Radiation beams can be used to form image 19 on recording media 17 by different methods. For example, radiation beams can be used to image-wise ablate a surface of recording media 17. Radiation beams can be used to cause an image-wise transference of an image-forming material from a donor element to a surface of recording media 17 (e.g. a thermal transfer process). Recording media 17 can include an image modifiable surface, wherein a property or characteristic of the modifiable surface is changed when irradiated by a radiation beam emitted by a marking element 40. A radiation beam can undergo a direct path from a radiation source to recording media 17 or can be deflected by one or more optical elements towards the recording media.

Forming an image 19 on recording media 17 with good visual quality typically requires that image elements 45 be correctly positioned on recording media 17 and include visual attributes that can cause imaged areas to be properly distinguished from non-imaged areas. The placement of image elements 45 (e.g. image pixels or dots) on a recording media 17 is dependant on numerous factors. In some cases, the data (i.e. image data 37) that controls the activation of the marking elements can have an effect on the placement accuracy of the formed image elements 45. For example, a common method of separating image-forming drops from non-image forming drops in a continuous inkjet system includes electrostatically charging and electrostatically deflecting selected drops in various drop streams. In some cases, a charge electrode is positioned along the flight path of each drop stream. The charge electrode selectively charges drops as the drops pass in the vicinity of the electrodes. One or more deflection electrodes deflect a charged drop towards a gutter or towards the recording media. This charge-based characterizing of the drops may however cause electrostatic crosstalk to arise between various drops in adjacent drop streams, thereby adversely affecting their desired placement on the recording media.

Visual characteristics variances among arrangements of formed image elements 45 can occur for various reasons. For example, some imaging systems employ grating spatial light modulators to modulate radiation in accordance with image data. A grating spatial light modulator that employs activation fingers to modulate its channels can require a compromise to be made between a desired addressability of the channels and a desired contrast of the image elements formed by the activation of the channels. Using multiple fingers to modulate a single channel can allow for better contrast control but with a reduced addressability. Using a single finger to control a single channel can allow for improved addressability but can also reduce the contrast control which can lead to image artifacts such as banding. Image data requiring high resolution image elements can be subject to contrast problems.

Figure 3:
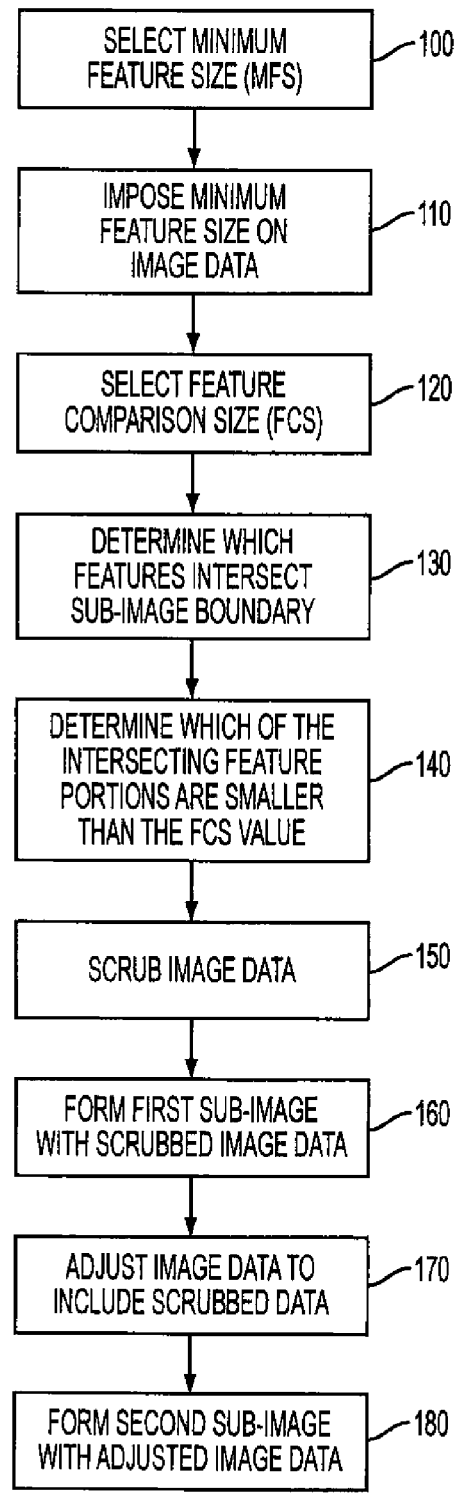
FIG. 3 is a flow chart representing a method as per an example embodiment of the invention.

FIG. 3 shows a flow chart representative of a method for forming an image from a plurality of sub-images as per an example embodiment of the invention. Although, the illustrated method refers to apparatus 10, it is to be understood that other suitable image forming apparatus can just as readily be used by various embodiments of the invention. In step 100, a minimum features size (MFS) is selected. The minimum feature size can be selected to avoid data dependant artifacts that can arise during the formation of image elements 45. For example, a particular MFS value can be selected to reduce data dependant placements errors or variations in the visual characteristics of the image elements 45. The minimum feature size is selected to restrict a particular size of an image feature 47 to a size sufficient to reduce a placement error or visual characteristic deviation of the image elements 45 used to form that image feature to acceptable levels. In some example embodiments of the invention, the minimum features size specifies a threshold number of image elements that are required to form a portion of an image feature 47 with a size suitable to reduce an image artifact associated with the formation of that feature 47 to acceptable levels. For example, in the case of image forming systems that employ grating light valves which suffer from the aforementioned contrast/addressability dilemma, a minimum feature size selected in accordance with various embodiments of the invention can lead to a suitable compromise. A desired addressability can be maintained, while reducing the contrast problem by restricting a minimum feature size (MFS) to be transferred through the modulator via the image data 37 thereby enabling a sufficient number of fingers of the modulator to be employed to improve contrast while still allowing a reasonably high addressability. In this case, the minimum feature size (MFS) specifies a lower size limit for the various imaged features 47 and can correspond to required number of fingers that need to be enabled to form the features with reduced contrast problems. In other embodiments of the invention, a suitable minimum feature size can be selected to form various image features 47 with reduced data dependant positional errors.

In many cases, the number of marking elements 40 is insufficient to completely form image 19 during a single marking. Accordingly, image 19 is formed by merging multiple sub-images 50 together, each of the sub-images 50 being formed during a corresponding marking. Each of the sub-images 50 can be formed in different manners. For example, image 19 can be formed from plurality of markings referred to as "shots". During each shot, print head 16 is positioned relative to a region of recording media 17. Once positioned, marking elements 40 are activated to form a sub-image 50 on the region of recording media 17. Once the sub-image 50 is formed, relative movement between print head 16 and recording media 17 is effected to position print head 16 in the vicinity of an adjacent region and another shot is taken to form a next sub-image 50.

The various sub-images can also be formed by scanning. Scanning can include establishing relative movement between print head 16 and recording media 17 as the marking elements 40 are activated to form corresponding image elements 45. A raster line comprising a series of image elements 45 is formed along a scan direction by a given marking element 40 as relative movement between the given marking element 40 and the recording media 17 is established. Relative movement can include moving one or both of the marking elements 40 and recording media 17. The various raster lines of image elements 45 combine to form an image swath. In this manner various image portions are formed in corresponding image swaths. In the case of some drum-based scanning methods, the image swaths can extend helically around the drum. Helical swaths can be formed by simultaneously establishing relative movement between print head 16 and recording media 17 along both main-scan axis 26 and sub-scan axis 24. In this illustrated example embodiment, ring-like swaths are formed, and a relative sub-scan movement between print head 16 and recording media 17 is performed between completion of a first image swath and the start of the formation of a second image swath. In some example embodiments of the invention, scanning can be performed by deflecting radiation beams emitted by marking elements 40 relative to recording media 17 to form the image.

Figure 2:
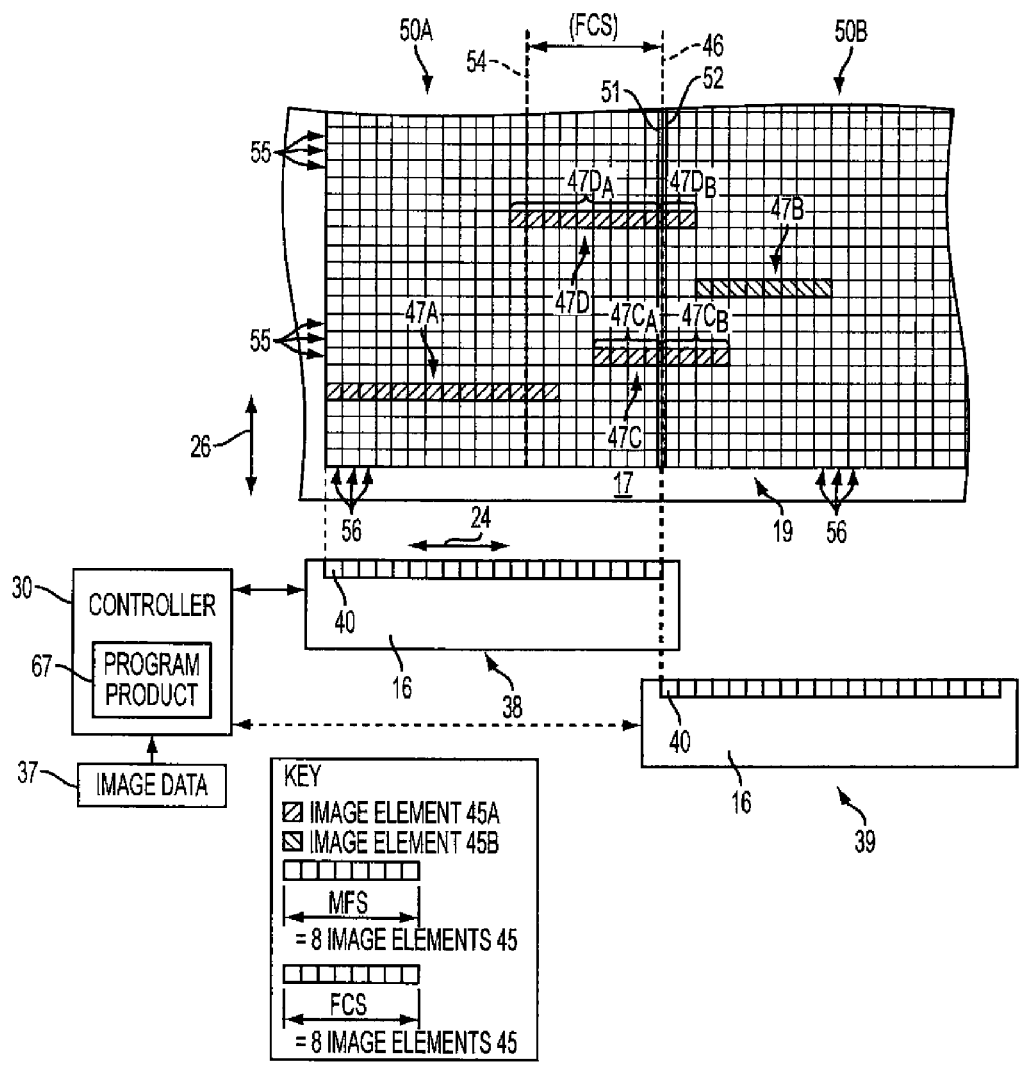
FIG. 2 is a schematic plan view of a desired alignment of a plurality of sub-images used to form an image on a recording media.

FIG. 2 schematically shows a desired alignment of a first sub-image 50A and a second sub-image 50B used to form a portion of image 19 in accordance with image data 37. Recording media 17 and the associated portion of image 19 are shown in an unwrapped or "flat" orientation for clarity. First sub-image 50A and second sub-image 50B are collectively referred to as sub-images 50. Each of the sub-images 50A and 50B are to be formed separately by corresponding patterns of image elements 45A and 45B (collectively referred to as image elements 45). In this case, each of the image elements 45A and 45B are to be arranged in a two dimensional matrix. The matrix is made up of rows 55 of the image elements 45 and columns 56 of the image elements 45. The formation of each image element 45 in the matrix corresponds to specific data arranged in image data 37. Each image element 45 is formed by activating a marking element 40 in accordance with an image data signal corresponding to the formation of that image element. The patterned image elements 45 further distinguish marked regions of each sub-image from unmarked regions of each sub-image. In this case the marked regions represent various image features 47 defined by image data 37.

In this illustrated embodiment of the invention, it is desired that a plurality of image features 47A, 47B, 47C, and 47D (collectively known as image features 47) be formed by various arrangements of the image elements 45. In this example embodiment of the present invention, the selected minimum feature size is imposed on image data 37 in step 110 to limit a size of each of the image features 47 when they are eventually formed. In this case, image data 37 has been restricted by the minimum features size to limit the subsequent formation of each image feature 47 with an arrangement of contiguous image elements 45 not numbering fewer than eight (8). In this example embodiment, the size of each image feature 47 has been restricted along a row 55 of the image elements 45. In various example embodiments of the invention, a size of each image feature 47 is restricted along a cross-scan direction that intersects a scan direction employed in the formation of the image elements 45. Yet in other example embodiments of the invention, a minimum features size is not employed and a size of the image features 47 is not restricted.

The image elements 45A and 45B are patterned for clarity in accordance with the KEY of FIG. 2 to distinguish first sub-image 50A from second sub-image 50B. In this case, image feature 47A is to be entirely formed in first sub-image 50A while image feature 47B is to be entirely formed in second sub-image 50B. In this case, each of image features 47C and 47D are to be partially formed in each of first sub-image 50A and second sub-image 50B. Each of the sub-images 50 are bounded by various boundaries. Proper alignment between the various image features 47 formed in first sub-image 50A with the various image features 47 formed in second sub-image 50B requires that the sub-image boundary 51 of first sub-image 50A align with the sub-image boundary 52 of second sub-image 50B at proposed merge line 46. It is to be noted that sub-image boundary 51 and sub-image boundary 52 are shown slightly offset from proposed merge line 46 for clarity only and that image data 37 typically specifies information representing first and second sub-images 50A and 50B as if they were merged together at proposed merge line 46.

The merging of first and second sub-images 50A and 50B at proposed merge line 46 can lead to various problems. For example, in some cases, spatial misalignments between print head 16 and recording media 17 during the formation of each of the first and second sub-images 50A and 50B can lead to stitching errors. Visual characteristic variations among the formed image elements 45 can also create artifacts during the merging of first and second sub-images 50A and 50B. Yet in other cases, image data dependant factors can lead to image element placement errors and/or visual characteristic deviations that can hinder stitching efforts. For example, image artifacts such as insufficient image contrast can also arise from the desire to merge various portions of an image feature 47 at proposed merge line 46. In this illustrated embodiment, although a particular size of each image feature 47 was restricted to not be less than the selected minimum feature size (MFS) value that was imposed on image data 37 to avoid contrast problems, some of the image features 47 (i.e. image features 47C and 47D) would be broken down or "clipped" into various portions at the boundaries of adjacently formed sub-images 50. Since these feature portions are separately formed, one or more of these formed portions may not meet the requirements of the selected minimum feature size value and a contrast problem can arise. In this case, the contrast problems can vary in a data dependent manner.

In this example embodiment of the invention, "stitching" techniques are disclosed to compensate for possible problems that can occur between adjacently formed sub-images. In some cases, practicing these techniques will lead to a stitching pattern that varies along one or more directions in accordance with attributes of the image data that correspond to the image features 47 that are to be formed in the vicinity of a boundary of the stitching pattern.

In this illustrated embodiment of the invention, each of first and second sub-images 50A and 50B are to be separately formed by scanning print head 16 relatively to recording media 17 at various positions. FIG. 2 shows that print head 16 would be positioned at first position 38 during the formation of first sub-image 50A and would be positioned at second position 39 during the formation of second sub-image 50B. For clarity, the positioning of print head 16 at second position 39 is shown offset from the positioning of print head 16 at first position 38. Various raster lines of image elements 45 are to be scanned along a scan direction (i.e. along a direction of main-scan axis 26 in this example) to form first sub-image 50A in a first image swath and second sub-image 50B in a second image swath. In this case, the raster lines are contiguously arranged along a cross-scan direction that intersects the scan direction (i.e. along a direction of sub-scan axis 24 in this example). Marking elements 40 can be arranged along various directions within print head 16. The arrangement directions need not be parallel to either the intended scan direction or cross-scan direction. For example, positioning print head 16 such that an arrangement direction of the marking elements 40 assumes a skewed orientation with a desired cross-scan direction can be used to adjust a cross-scan resolution of the marking elements 40. In this illustrated embodiment, each raster line of image elements 45 is formed by a corresponding marking element 40. In this illustrated embodiment, each raster line corresponds to a column 56 of the image elements 45. In other example embodiments of the invention, other image forming methods are employed.

In this example embodiment of the invention, a stitching pattern between sub-images 50 is determined on the basis the image information in the vicinity of the sub-image boundaries 51 and 52. In step 120, a feature comparison size (FCS) value is selected. A stitching algorithm between first sub-image 50A and second sub-image 50B is determined based on the selected FCS value. In this illustrated embodiment, the FCS value corresponds to a cross-scan size of an arrangement of the image elements 45 (i.e. a size of the image elements along a direction that intersects the scan direction). In this illustrated embodiment, the FCS value corresponds to a size of an arrangement of image elements 45 along a row 55 of image elements 45. In this illustrated embodiment, the FCS value is selected to be eight (8) image elements wide. An FCS boundary 54 which is eight (8) image elements apart from sub-image boundary 51 of first sub-image 50A is shown to allow a comparison of the size of various image features 47 with the FCS value. It is to be noted however that an FCS value equal to the cross-scan size of eight (8) image elements is shown for the purpose of illustration, and other example embodiments of the invention can employ other FCS values.

The feature comparison size can be selected in various ways. In some example embodiments of the invention, the feature comparison size value is selected randomly or pseudo-randomly. In some example embodiments of the invention, a feature comparison size value is selected to avoid artifacts at sub-image boundaries. In some cases, the artifacts can be related to a size characteristic of a image feature 47 formed in the vicinity of a sub-image boundary. In some example embodiments of the invention, the feature comparison size is determined based at least on various characteristics or limitations of the marking process. In this example embodiment of the present invention the FCS value is determined based at least on the selected minimum feature size (MFS) value. In some example embodiments of the present invention, the FCS value can be determined from relationship that is a linear function of an MFS value, while in other example embodiments, the FCS value can be determined from relationship that is a non-linear function of an MFS value. In some example embodiments of the present invention, the feature comparison size can be determined to be different between different groups of sub-images 50. In some example embodiments of the present invention, the feature comparison size can be determined to vary along a desired scan direction or along a direction in which the stitching pattern is to extend along. Those skilled in the art will now realize that other methods and criteria for selecting the feature comparison size can be readily employed and are within the scope of the present invention. In this illustrated embodiment of the present invention, the FCS value selected to be equal to the minimum feature size of image features 47 whose cross-scan sizes have been limited by image data 37 to be a minimum of eight (8) image elements wide.

In step 130, portions of image data 37 corresponding to the first sub-image 50A is analyzed. Specifically, data corresponding to first sub-image 50A is analyzed to determine which of the image features 47 in first sub-image 50A would intersect sub-image boundary 51. FIG. 2 shows that each of image features 47C and 47D have portions that are to be formed in first sub-image 50A, and if so formed, would intersect the sub-image boundary 51. In this case, feature portions 47$C_A$ and 47$D_A$ would intersect sub-image boundary 51.

In step 140, portions of image data 37 corresponding to first sub-image 50A are analyzed to determine which of the intersecting feature portions has a size that is less than the selected feature comparison size value (i.e. the width of eight (8) image elements). In this example embodiment, a cross-scan size of the intersecting feature portions is compared against the feature comparison size value. In this example embodiment, an analysis of image data 37 would indicate that feature portion 47$D_A$ would intersect sub-image boundary 51 and would have a size greater than the feature comparison size. Specifically, feature portion 47$D_A$ has a size equal to the width of nine (9) contiguously arranged image elements. However, an analysis of image data 37 would also indicate that feature portion 47$C_A$ would intersect sub-image boundary 51 and would be less than the feature comparison size. In this case, feature portion 47$C_A$ has a width equal to four (4) contiguously arranged image elements.

In step 150, image data 37 is modified to remove or "scrub" information that represents the image feature portions 47 that are smaller than the feature comparison size and that intersect a boundary of the sub-image in which they are to be formed. The modified image data is referred to as scrubbed image data 37A. In this illustrated embodiment, data corresponding to feature portion 47$C_A$ is scrubbed while data corresponding to feature portion 47$D_A$ is not. Modifications made to image data 37 need not be permanent in nature. Modifications made to image data 37 can be confined to a portion of the data corresponding to the formation of first sub-image 50A. This portion of the data can be buffered for use by print head 16 during the formation of first sub-image 50A. In some example embodiments, parts of image data 37 is scrubbed before it is buffered, while in other embodiments it is scrubbed after it is buffered.

Figure 4A:
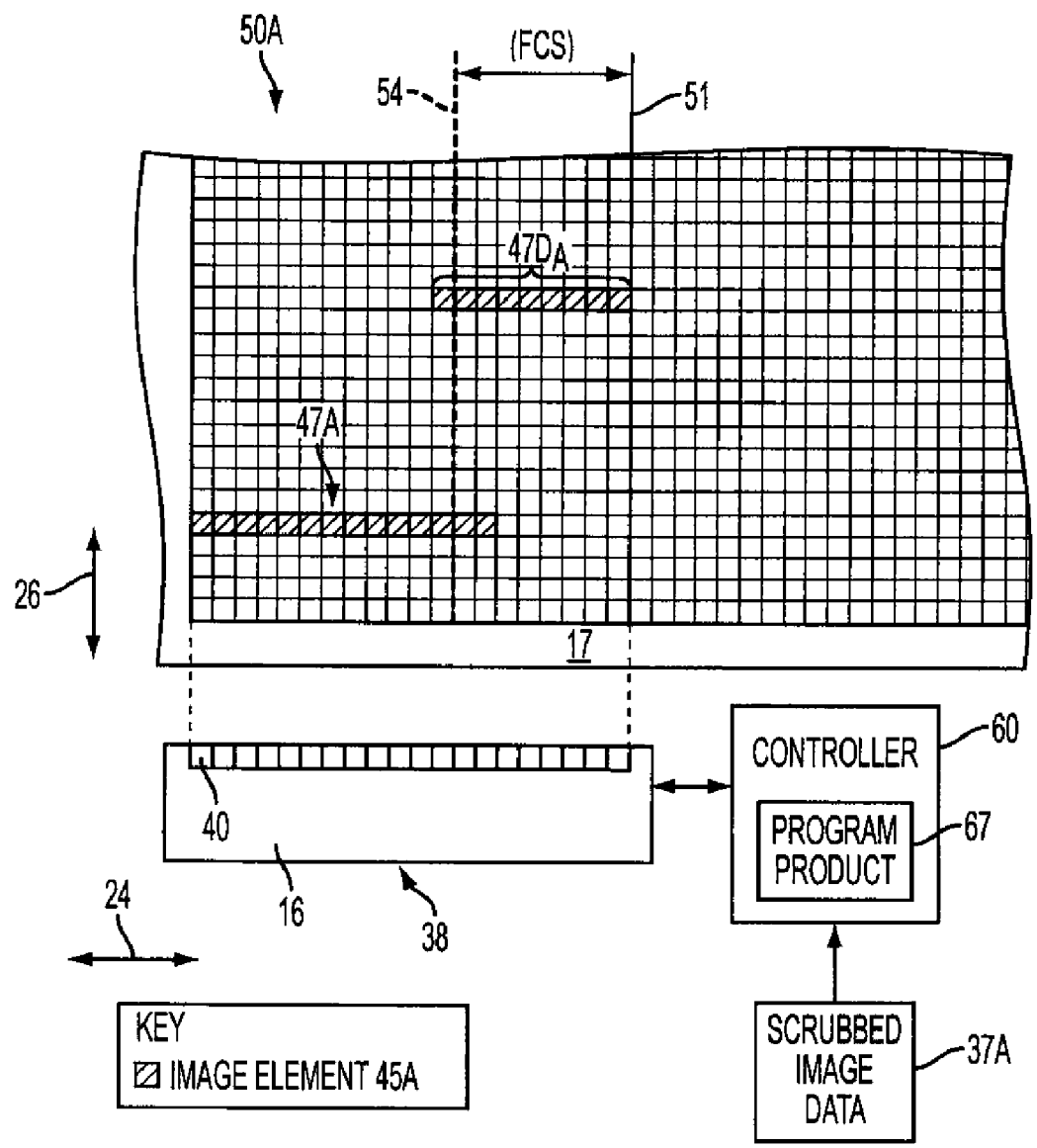
FIG. 4A is a schematic plan view of a first sub-image of the plurality of sub-images of FIG. 2 formed as per an example embodiment of the invention.

In step 160 scrubbed image data 37A is provided to print head 16 which forms first sub-image 50A on recording media 17 in accordance with the scrubbed data. FIG. 4A schematically shows a marking of recording media 17 in accordance with scrubbed image data 37A. For clarity, recording media 17 is again shown in a "flat" orientation to better show the formation of first sub-image 50A. In this example embodiment, print head 16 is positioned relative to recording media 17 at first position 38. As shown in FIG. 4A, only image feature 47A and feature portion 47$D_A$ are formed in first sub-image 50A since information related to feature portion 47$C_A$ has been scrubbed. The image features 47 and portions thereof formed in first sub-image 50A are formed with image elements 45A as referenced in the KEY of FIG. 4A.

In step 170, parts of image data 37 corresponding to the formation of second sub-image 50B are adjusted to include data representing the scrubbed feature portions. In this illustrated embodiment, image data corresponding to second sub-image 50B is adjusted to include data corresponding to scrubbed feature portion 47$C_A$. In this example embodiment, adjusted image data 37B is formed. In various example embodiments of the invention, parts of image data 37 corresponding to the second sub-image 50B is adjusted to correspond to a second sub-image 50B that is to be formed on recording media 17 in an overlapped relationship with formed first sub-image 50A. That is, adjusted image data 37B corresponding to second sub-image 50B is adjusted to include other data that corresponds to various feature portions including the scrubbed feature portions. This adjusted data includes a portion of the data corresponding to desired second sub-image 50B and additional data corresponding to the formation of additional feature portions on a region of recording media 17 that is to be overlapped by second sub-image 50B. In some example embodiments, adjusted image data 37B is adjusted by shifting image data corresponding to second sub-image 50B based at least on the amount of desired overlap.

In various example embodiments of the invention, the amount of overlap between sub-images 50 can be related to the feature comparison size. In various embodiments of the present invention, the amount of overlap can be related to the minimum feature size. In various embodiments of the invention, the amount of overlap is selected to be equal or greater than the feature comparison size. In various embodiments of the invention, the amount of overlap is selected to be equal or greater than the minimum feature size. In this illustrated embodiment of the present invention, the amount of overlap is selected to be equal to the feature comparison size (i.e. the width of eight (8) image elements in this case) which has in turn, been selected to equal the minimum feature size. Adjusted image data 37B corresponding to the formation of second sub-image 50B is therefore shifted by eight (8) image elements to correspond with desired overlap with first sub-image 50A.

Figure 4B:
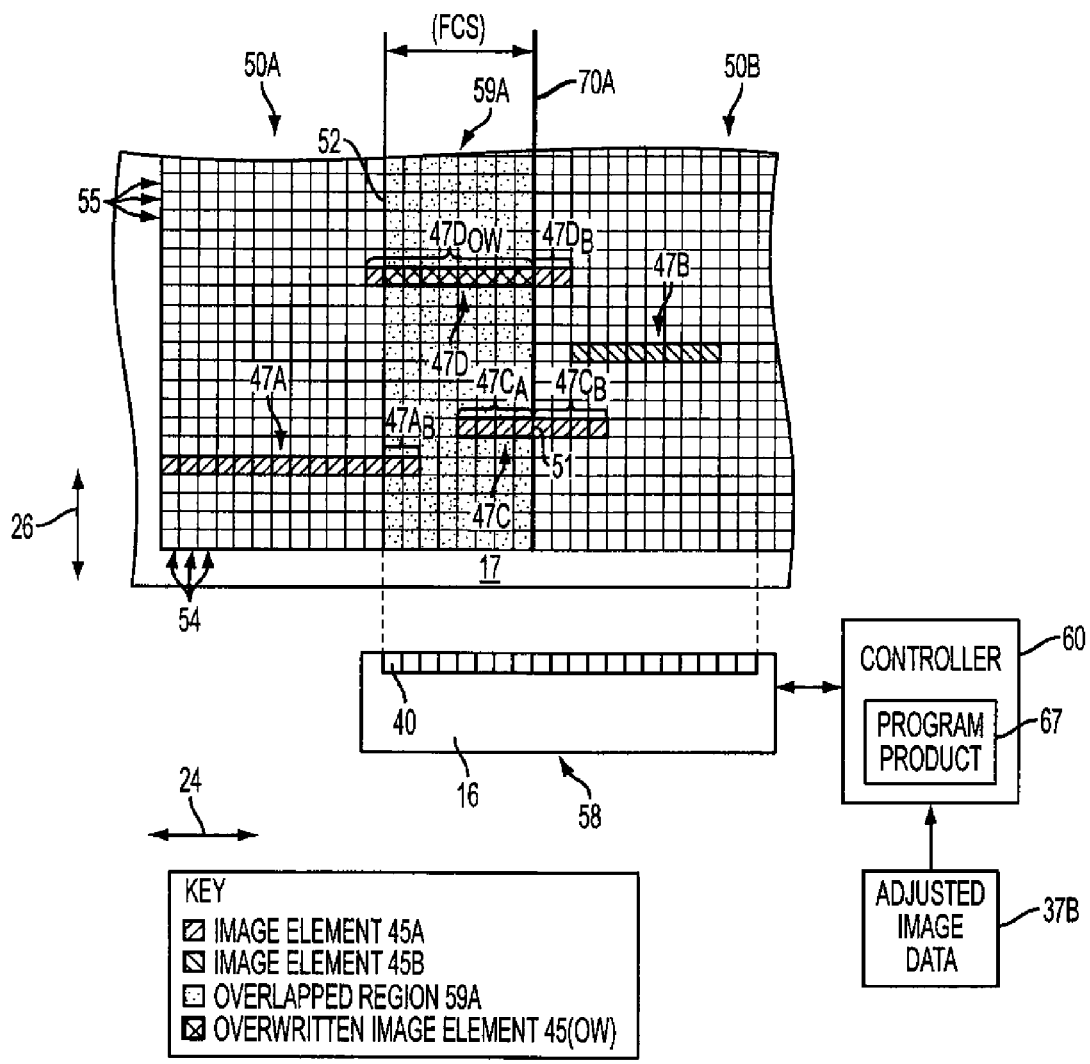
FIG. 4B is a schematic plan view of a second sub-image of the plurality of sub-images of FIG. 2 formed as per an example embodiment of the invention.

In various example embodiments, various feature portions that are to be formed in a region that is overlapped by sub-images 50 can be formed in either or both of the overlapping sub-images 50. For example, as shown in FIG. 4B, feature portion 47$C_A$ can be formed in an overlapped region 59A having a width of eight (8) image elements by either of first sub-image 50A or repositioned second sub-image 50B. In this embodiment, since feature portion 47$C_A$ was not formed in first sub-image 50A, image data 37 is adjusted to form it in second sub-image 50B.

Adjusted image data 37B now contains information representative of feature portions 47$C_A$ that was not formed during step 160. In step 180 the adjusted image data 37B is provided to print head 16 which marks recording media 17 in accordance with the adjusted data. FIG. 4B shows a marking of recording media 17 in accordance with the adjusted image data 37B. In this illustrated embodiment, print head 16 is appropriately positioned relative to recording media 17 at a position 58 where it is desired to form shifted second sub-image 50B in the correct overlapped orientation with previously formed first sub-image 50A. In this illustrated embodiment, motion system 22 (not shown in FIG. 4B) repositions print head 16 after forming first sub-image 50A by moving print head 16 along a direction aligned with sub-scan axis 24. In some example embodiments of the invention, print head 16 can be repositioned with respect to recording media 17 while forming first sub-image 50A. For example, helical scanning techniques can be employed to form first sub-image 50A such that print head 16 is correctly positioned to form overlapping second sub-image 50B after the completion of first sub-image 50A.

As shown in FIG. 4B, feature portion 47$C_A$ that was not formed during the formation of first sub-image 50A is formed during the formation of overlapping second sub-image 50B. Feature portion 47$C_A$ is accordingly formed with image elements 45B on an overlapped region 59A defined by sub-image boundaries 51 and 52. In this illustrated embodiment of the invention, feature portion $47C_A$ is formed in a first sub-image 50 such that it does not intersect a boundary of the sub-image 50 it is formed in. As shown in FIG. 4B, feature portion $47C_A$ is formed such that it does not intersect a boundary (i.e. sub-image boundary 52 in this example) of second sub-image 50B. An additional portion of feature 47C (i.e. feature portion $47C_B$) is also formed in second sub-image 50B along with feature portion $47C_A$. In this regard, parts of image data 37 corresponding to feature portion $47C_A$ that was formable in first sub-image 50A with a size that is less than the feature comparison size is effectively adjusted to form a feature portion in second sub-image 50B with an adjusted size (i.e. the combined size of feature portions $47C_A$ and $47C_B$) that is not less than the feature comparison size. In various example embodiments, parts of image data 37 corresponding to a given portion of an image feature 47 that was formable in a first sub-image 50 with a size that is less than the minimum feature size is effectively adjusted to form a portion of the feature in a sub-image 50 with an adjusted size that is not less than the minimum feature size. In this illustrated example embodiment, the entirety of the image feature 47C is now formed in a single sub-image 50 (i.e. second sub-image 50B) and image feature 47C no longer intersects a boundary of the sub-image 50 in which it formed in. Advantageously, since image feature 47C is no longer clipped into separate portions, issues such as the aforementioned contrast problems can be reduced. FIG. 4B further shows that image feature 47B is also formed in second sub-image 50B. Overlapped region 59A is shaded for clarity in accordance with the KEY in FIG. 4B.

The inclusion of additional information pertaining to the feature portion $47C_A$ need not be the only adjustments made to adjusted image data 37B used during the formation of second sub-image 50B. For example, in the illustrated embodiment, adjusted image data 37B can also include information related to image features 47A and 47D. In some example embodiments of the present invention, adjusted image data 37B includes part of this information and some feature portions that were previously formed in first sub-image 50A are overwritten during the formation of overlapping second sub-image 50B. For example, FIG. 4B shows that in addition to the formation of feature portion $47D_B$, a portion of feature 47D that was previously formed during the formation of first sub-image 50A is overwritten during the formation of overlapping second sub-image 50B. The overwritten feature portion is $47D_{OW}$ and is shown formed by overwritten image elements 45(OW) as defined in the KEY of FIG. 4B. Overwritten image elements 45(OW) are formed by overlapped arrangements of image elements 45A and 45B.

In some example embodiments of the present invention, overwritten feature portions are formed with different attributes in each of the overlapping sub-images 50 used to form the overwritten feature portions. For example, print head 16 can be controlled to adjust a visual characteristic of the overwritten feature portions in each of the sub-images 50. Visual characteristics can include optical density or color density, for example. Overwritten features can sometimes cause visual artifacts associated with varying contrast. Banding can arise from density variations, particularly if they occur in the vicinity of image boundaries. Objectionable variations can arise between overwritten feature portions and feature portions that are not overwritten. In some example embodiments of the present invention, print head 16 is controlled to form an overwritten feature portion with an image forming material that has a different characteristic (e.g. color or optical density, etc.) than the image forming material that is used to form a feature portion that is not overwritten. In some example embodiments of the present invention, print head 16 forms features by imaging radiation beams and overwritten features are formed with radiation beams that have different intensities than the radiation beams used to form features that are not overwritten. Different intensities can include lower intensities. Characteristics of overwritten image features 47 can be varied during their initial formation in a first sub-image 50A and/or during their reformation in a subsequent sub-image 50.

In some example embodiments of the invention, feature portions such as $47A_B$ are not overwritten during the formation of overlapping second sub-image 50B. In step 170, adjusted image data 37B can be further modified to remove or "scrub" information that corresponds to various feature portions (e.g. feature portion $47A_B$) that could be overwritten during the subsequent formation of second sub-image 50B. It may be desired that feature portions such as feature portion $47A_B$ be not overwritten for various reasons. For example, in a manner similar to step 150 adjusted image data 37B can be further modified to remove or "scrub" information that corresponds to previously formed feature portions that are smaller than the feature comparison size. In this illustrated embodiment, a comparison is made between the feature comparison size and various feature portions. For example, previously formed feature portion $47A_B$ is only two (2) image elements in size and is less than the feature comparison size (i.e. the size of 8 image elements). Algorithms similar to the algorithm used in steps 130 and 140 can be used to determine whether or not a feature portion would intersect second sub-image boundary 52 during the formation of second sub-image 50B and would be smaller than a selected feature comparison size. In this illustrated embodiment of the invention, such an algorithm is employed and feature portion $47A_B$ is not overwritten since it intersects second sub-image boundary 52 and is smaller than the feature comparison size. Accordingly feature portion $47A_B$ is only formed in first sub-image 50A. FIGS. 4A and 4B show that of each of feature portions $47A_B$ and $47C_A$ are each formed in only one of the first and second sub-images 50A and 50B. In this example embodiment, each of feature portions $47A_B$ and $47C_A$ are formed in different sub-images 50 and each are formed such that they do not intersect an image boundary of the specific sub-image 50 that they are formed in.

Rewritten feature portion $47D_{OW}$ also intersects sub-image boundary 52. However since rewritten feature portion $47D_{OW}$ is not smaller than the feature comparison size, it is overwritten in overlapping second sub-image 50B.

Those skilled in the art will now realize that marking methods practiced in accordance with the invention can result in the formation of overlapping sub-images 50 that are stitched together with stitching patterns that vary as a function of features formed in the vicinity of the boundaries of the sub-images 50. The stitching patterns can extend along a first direction and shift from side-to-side in an image data dependant manner along a second direction that intersects the first direction. An exemplary stitching pattern stitching pattern 70A is shown in FIG. 4B. Stitching pattern 70A is represented by a bolded line which is shown partially overlying various edges of some portions of image features 47 and some portions of sub-image boundaries 51 and 52. Stitching pattern 70A is shown looping around feature portion $47D_{OW}$ since this feature portion is overwritten. In this illustrated embodiment, stitching pattern 70A extends along a direction that is substantially parallel to the scanning direction. Those skilled in the art will realize that stitching pattern 70A will shift from side-to-side along a cross-scan direction. The number of shifts and the size of the shifts will vary as a function of various feature portions which intersect a sub-image boundary and comprise a size less than a selected feature comparison size.

Figure 5:
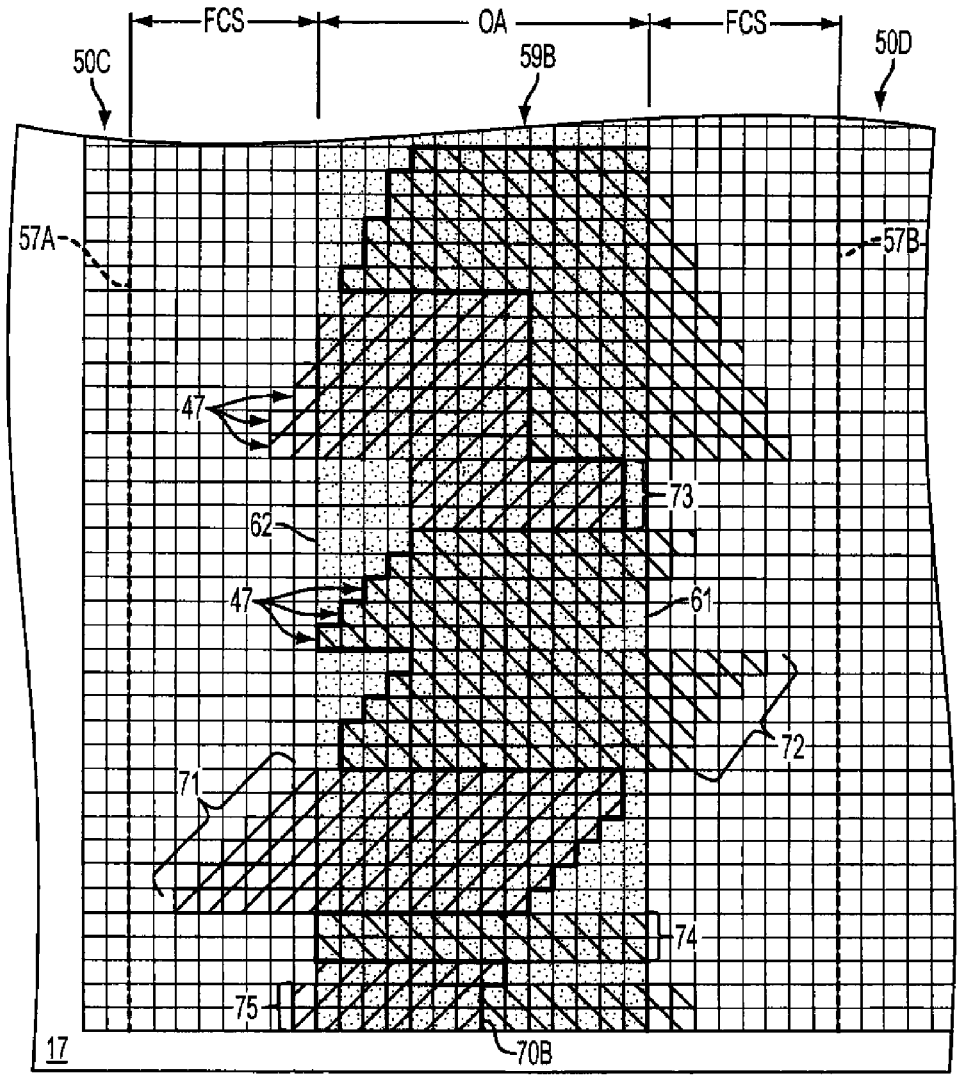
FIG. 5 is a schematic plan view of a plurality of sub-images stitched together as per an example embodiment of the invention.

FIG. 5 shows a plurality of image features 47 formed on recording media 17 as per another example embodiment of the invention. In this illustrated embodiment of the invention, a minimum feature size equal to the width of eight (8) image elements 45 was selected. Each of the image features 47 is accordingly restricted to have a size at least equal the minimum feature size.

A first sub-image 50C and a second sub-image 50D are formed in an overlapped relationship on recording media 17. First sub-image 50C is formed with image elements 45C and second sub-image 50D is formed with image elements 45D. In this illustrated embodiment, an overlap region 59B is formed between the sub-image boundary 61 of first sub-image 50C and the sub-image boundary 62 of second sub-image 50D. In this illustrated embodiment, first sub-image 50C and second sub-image 50D overlap each other by an amount determined by the following relationship:

$$OA=(2*MFS)-(2*I), \qquad (1)$$

where:
OA is the amount of overlap
MFS is the minimum feature size; and
I is a size of the image elements 45.

In this case, overlapped region 59B is shown to be the size of fourteen (14) image elements (i.e. the size of $(2*8)-(2*1)$ image elements 45). Image elements 45C, 45D and overlapped region 59B are patterned and shaded in accordance with the KEY of FIG. 4C. In one embodiment, "I" may be unit size, for example, number of pixels.

A feature comparison size (FCS) is selected. In this example embodiment of the invention, the feature comparison size is selected based on the minimum feature size. In other example embodiments, the features comparison size can be selected on the basis of other criteria. In this example embodiment, the FCS value is selected to equal the minimum feature size and is equal to the size of eight (8) image elements. FCS boundaries 57A and 57B which are each shown to be eight (8) image elements apart from sub-image boundaries 61 and 62 are shown to allow a comparison of the size of various image features 47 with the FCS value. FCS boundaries 57A and 57B are shown outside of overlapped region 59B for clarity.

A stitching pattern 70B formed in accordance with this example embodiment of the present invention separates selected portions of the various image features 47 formed in each of first and second sub-images 50C and 50D. The distribution of the various feature portions formed in a particular one of first and second sub-images 50C and 50D is determined by a method similar to that described in conjunction with flow chart shown in FIG. 3. The distribution of the portions of image features 47 was determined for various cases. In each of the cases, portions of the image features 47 that could be formed in overlapped region 59B were checked to determine whether or not they intersected various ones of the sub-image boundaries 61 and 62. In each of the cases, sizes of various portions of the image features 47 that could intersect various ones of sub-image boundaries 61 and 62 were compared against the feature comparison size.

For example, in some cases, a given image feature 47 can be formed such that it would intersect one, but not both of the sub-image boundaries 61 and 62. In this case, the particular intersected sub-image boundary can cause the image feature 47 to be divisible into a plurality of portions which can include a portion within overlapped region 59B and an additional portion outboard of overlapped region 59B. A size of each of the portions of the intersected image feature 47 is compared against the feature comparison size. In this example embodiment, if one or more of the portions is determined to be less than the feature comparison size, then the plurality of feature portions is formed in single one of first and second sub-images 50C and 50D such that the plurality of feature portions do not intersect the boundary of the particular one of the sub-images 50C and 50D that they are both formed in. For example, portions of the image features 47 in first set 71 can be formed such that the portions intersect sub-image boundary 62 of second sub-image 50D. The portions of the image features 47 in first set 71 that can be formed in overlapped region 59B are all greater in size than the feature comparison size. However, since the portions of the image features 47 of first set 71 located outboard of overlapped region 59B are smaller than the feature comparison size, then the image features 47 in first set 71 are formed in their entirety in first sub-image 50C with image elements 45C. In a similar fashion the image features 47 in second set 72 which include portions that are smaller than the feature comparison size are formed in their entirety in second sub-image 50D with image elements 45D. Each of the image features 47 in each of the respective first set 71 and second set 72 are formed such that they do not intersect an image boundary of the specific sub-image 50 that they are formed in.

In the case where an image feature 47 can be formed on overlapped region 59B without intersecting either of sub-image boundaries 61 and 62, the image feature 47 can be formed in either of first and second sub-image 50C and 50D. In this example embodiment of the present invention, image features 47 in third set 73 can be formed without intersecting either sub-image boundaries 61 and 62. In this example embodiment of the invention, the image features 47 in third set 73 are formed in first sub-image 50C with image elements 45C. In other example embodiments of the invention, the image features 47 in third set 73 are formed in second sub-image 50D. In yet other example embodiments of the invention, various image features 47 within third set 73 can be formed in first sub-images 50C while other image features 47 within third set 73 can be formed in second sub-image 50D. Various image features 47 in third set 73 can be formed in either of first and second sub-images 50C and 50D in a random or pseudo random fashion.

In the case where a image feature 47 can be formed on overlapped region 59B such that it intersects both sub-image boundaries 61 and 62, and is equal to a size of the overlapped region 59B, the image feature 47 can be formed in either of first and second sub-image 50C and 50D. In this example embodiment of the invention, image feature 47 in fourth set 74 would intersect both sub-image boundaries 61 and 62 but would have sizes equal to the size of overlapped region 59B. In this example embodiment of the invention, the image feature 47 in fourth set 74 are formed in second sub-image 50D with image elements 45D. In other example embodiments of the present invention, the image features 47 in fourth set 74 are formed in first sub-image 50C. In yet other example embodiments of the invention, various image features 47 within fourth set 74 can be formed in second sub-images 50D while other image features 47 within fourth set 74 can be formed in first and second first sub-image 50C. Various image features 47 in forth set 74 can be formed in either of sub-images 50C and 50D in a random or pseudo random fashion.

In the case where an image feature 47 can be formed on overlapped region 59B such that it intersects both sub-image boundaries 61 and 62, and is sized to be greater than a size of the overlapped region 59B, various portions of each of these image features 47 can be formed outboard of overlapped region 59B. In this example embodiment of the invention, the size of each portion that can be formed outboard of overlapped region 59B is compared against the feature comparison size. If the size of a given one of these portions is determined to be less that the feature comparison size, then that portion and an additional portion of the image feature 47 that is formable in overlapped region 59B are both formed together in one of the first and second sub-images 50C and 50D. In this example embodiment of the invention, the image features 47 in fifth set 75 intersect both sub-image boundaries 61 and 62 and are greater in size than the size of overlapped region 59B. Specifically, these image features 47 include portions outboard of overlapped region 59B (i.e. outboard portions) which are one (1) and two (2) image elements wide. FIG. 5 shows that these outboard portions are not greater in size than the feature comparison size. In this example embodiment of the invention, each of these outboard portions is formed along with an additional portion of the feature within overlapped region 59B within one of the first and second sub-images 50C and 50D. In this case, each of these additional portions is sized such that they combine with their corresponding outboard portions to have an overall size that is at least equal to the feature comparison size. In this illustrated embodiment of the invention, portions of the image features 47 in fifth set 75 that are sized to each be eight (8) image elements wide are formed by image elements 45C in first sub-image 50C and the remaining portions of the image features 47 in fifth set 75 are sized to each be nine (9) image elements wide are formed by image elements 45D in second sub-image 50D. In this embodiment of the invention, each of these feature portions is formed such that they are not smaller than the feature comparison size. In this embodiment of the invention, each of these feature portions is formed such that they are not smaller than minimum feature size. In this embodiment of the invention, each of these feature portions is formed such that they do not intersect the boundary of the particular sub-image 50 in which they are formed.

The example embodiment of the invention illustrated in FIG. 5 results in a stitching pattern 70B that arises from forming portions of each image feature 47 in one of the first and second sub-images 50C and 50D. In this particular example embodiment of the invention, each of these feature portions is formed without overwriting. In this example embodiment of the invention, each of these feature portions is formed with a size that is not less than the feature comparison size. In this example embodiment of the invention, each of these feature portions is formed with a size that is not less than the minimum feature size.

A program product 67 can be used by controller 30 to perform various functions required by apparatus 10. One such function can include restricting the formation of various image features 47, or portions thereof, to at least equal a selected minimum feature size as taught herein. Another such function can include stitching a plurality of sub-images in accordance with a method taught herein. Without limitation, program product 67 may comprise any medium which carries a set of computer-readable signals comprising instructions which, when executed by a computer processor, cause the computer processor to execute a method as described herein. The program product 67 may be in any of a wide variety of forms. Program product 67 can comprise, for example, physical media such as magnetic storage media including, floppy diskettes, hard disk drives, optical data storage media including CD ROMs, DVDs, electronic data storage media including ROMs, flash RAM, or the like. The instructions can optionally be compressed and/or encrypted on the medium.

In one example embodiment of the present invention, program product 67 can be used to configure controller 30 to determine if a portion of a feature of the image that is to be formed on the recording media in a first sub-image of a plurality of sub-images has a size that is less than a selected minimum feature size value. In the event that it is determined that the size of the portion of the feature is less than the minimum feature size value, controller 30 can be configured to adjust a part of the image data to form the portion of feature in a sub-image of the plurality of sub-images with a size that is not less than the minimum feature size.

In one example embodiment of the invention, program product 67 can be used to configure controller 30 to determine if a portion of an image feature 47 that is to be formed on the recordable media with a row of the image elements intersects a boundary of a first sub-image of the plurality of sub-images. Controller 30 can be additionally caused to determine if the portion of the image feature 47 has a size that is less than a selected feature comparison size; and in the event that it is determined that the portion of the image feature 47 intersects the boundary and has a size that is less than the feature comparison size, scrub data representing the portion of the feature from a first part of the image data 37 corresponding to the first sub-image and adjust a second part of the image data 37 corresponding to a second sub-image of the plurality of sub-images to include corresponding data representing the scrubbed portion of the feature.

In the alternative, or additionally, controller 30 may permit manual adjustment of a stitching pattern disclosed by a method herein under the guidance of an operator communicating with controller 30 through an appropriate user interface. Stitching patterns determined in accordance with the present invention may be determined on the basis of suitable algorithms and/or data inputted to controller 30, or programmed within program product 67.

The invention has been described in detail with particular reference to certain preferred embodiments thereof, but it will be understood that variations and modifications can be effected within the scope of the invention.

PARTS LIST 10 apparatus
12 media support
13 surface
16 printhead
17 recording media
18 carriage
19 image
20 support
22 motion system
24 sub-scan axis
26 main-scan axis
28A clamping member
28B clamping member
30 controller
32 guide system
33 transmission member
37 image data
37A scrubbed image data
37B adjusted image data
38 first position
39 second position
40 marking element
45 image element 45A image element
45B image element
45C image element
45D image element
45(OW) overwritten image element
46 proposed merge line
47 image feature
47A image feature
47A$_B$ feature portion
47B image feature
47C image feature
47C$_A$ feature portion
47C$_B$ feature portion
47D image feature
47D$_A$ feature portion
47D$_B$ feature portion
47D$_{OW}$ rewritten feature portion
50 sub-image
50A first sub-image
50B second sub-image
50C first sub-image
50D second sub-image
51 sub-image boundary
52 sub-image boundary
54 FCS boundary
55 rows
56 columns
57A FCS boundary
57B FCS boundary
58 position
59A overlapped region
59B overlapped region
61 sub-image boundary
62 sub-image boundary
67 program product
70A stitching pattern
70B stitching pattern
71 first set
72 second set
73 third set
74 fourth set
75 fifth set
100 select minimum feature size (MFS)
110 impose minimum feature size on image data
120 select feature comparison size (FCS)
130 determine which features intersect sub-image boundary
140 determine which intersecting feature portions are smaller than the FCS value
150 scrub image data
160 form first sub-image with scrubbed image data
170 adjust image data to include scrubbed data
180 form second sub-image with adjusted image data

The invention claimed is:

1. A method for forming an image on recording media, comprising:
providing a support adapted to receive the recording media;
providing a controller programmed for controlling a print head comprising a plurality of individually controllable marking elements to form the image on the recording media in accordance with image data corresponding to the image; and
operating the print head to form a plurality of sub-images on the recording media, wherein the plurality of sub-images are stitched together to form the image with a stitching pattern that is determined based at least on a size of a portion of a feature of the image that can be formed in each sub-image of the plurality of sub-images.

2. A method according to claim 1 comprising determining the size of the portion of the feature along a direction that intersects a direction that the stitching pattern extends along.

3. A method according to claim 1 comprising forming the image on the recording media by operating the print head to scan across the recording media along a scan direction, and determining the size of the portion of the feature along a cross-scan direction.

4. A method according to claim 1 wherein each of the marking elements is controllable to form an image element on the recording media while scanning over the recording media along a scan direction, and the method further comprises determining the size of the portion of the feature based at least on a total number of contiguously arranged image elements that are required to form the portion of the feature along a cross-scan direction.

5. A method according to claim 1 comprising selecting a feature comparison size and determining if the size of the portion of the feature is less than the feature comparison size.

6. A method according to claim 5 wherein the print head is adapted to form rows and columns of image elements on the recording media, and the method comprises determining the size of the portion of the feature along a row of the image elements.

7. A method according to claim 5 comprising forming the portion of the feature on the recording media in only one of the plurality of sub-images in the event that the size of the portion of the feature is determined to be less than the feature comparison size.

8. A method according to claim 5 wherein the portion of the feature can be formed on a region of the recording media corresponding to overlapping portions of two sub-images of the plurality of sub-images; wherein the portions of the two sub-images overlap each other by an amount not less than the feature comparison size.

9. A method according to claim 5 comprising determining if the portion of the feature intersects a boundary of a first sub-image of the plurality of sub-images, and forming the portion of the feature in a second sub-image of the plurality of sub-images in the event that it is determined that the portion of the feature intersects the boundary of the first sub-image and the size of the portion of the feature is determined to be less than the feature comparison size.

10. A method according to claim 5 wherein the portion of the feature can be formed on a region of the recording media corresponding to overlapping portions of a first sub-image of the plurality of sub-images and a second sub-image of the plurality of sub-images, and the method comprises forming the portion of the feature on the region in both of the first sub-image and the second sub-image in the event that the size of the portion of the feature is determined to be not less than the feature comparison size.

11. A method according to claim 10 comprising forming the portion of the feature with a different visual characteristic in each of the first sub-image and the second sub-image.

12. A method according to claim 11 wherein the visual characteristic is optical density or color density.

13. A method according to claim 5 wherein the portion of the feature and a portion of a second feature of the image can each be separately formed in a first sub-image of the plurality of sub-images and in a second sub-image of the plurality of sub-images on a region of the recording media corresponding to overlapping portions of the first sub-image and the second sub-image, and the method comprises:

forming the portion of the feature and the portion of the second feature on the region;

determining if a size of the portion of the second feature is less than the feature comparison size;

forming the portion of the feature in only one of the first sub-image and the second sub-image in the event that it is determined that the size of the portion of the feature is less than the feature comparison size; and forming the portion of the second feature in both of the first sub-image and the second sub-image in the event that it is determined that the size of the portion of the second feature is not less than the feature comparison size.

14. A method according to claim 5 wherein the portion of the feature and a portion of a second feature of the image can each be separately formed in a first sub-image of the plurality of sub-images and in a second sub-image of the plurality of sub-images on a region of the recording media corresponding to overlapping portions of the first sub-image and the second sub-image, and the method comprises:

forming the portion of the feature and the portion of the second feature on the region;

determining if a size of the portion of the second feature is less than the feature comparison size; and forming each of the portion of the feature and the portion of the second feature in different sub-images in the event that it is determined that the size of each of the portion of the feature and the portion of the second feature is less than the feature comparison size.

15. A method according to claim 14 comprising determining if each of the portion of the feature and the portion of the second feature intersects a boundary of either the first sub-image or the second sub-image, and in the event that it is determined that each of the portion of the feature and the portion of the second feature intersects the boundary of either the first sub-image or the second sub-image, the method farther comprises forming each of the portion of the feature and the portion of the second feature in a sub-image whose boundaries are not intersected by the one of the portion of the feature and the portion of the second feature that is formed in the sub-image.

16. A method according to claim 1 comprising determining if the portion of the feature intersects a boundary of a first sub-image of the plurality of sub-images, and forming the portion of the feature in a second sub-image of the plurality of sub-images in the event that it is determined that the portion of the feature intersects the boundary of the first sub-image.

17. A method according to claim 16 wherein the portion of the feature is formed in the second sub-image without intersecting a boundary of the second sub-image in the event that it is determined that the portion of the feature intersects the boundary of the first sub-image.

18. A method according to claim 1 wherein the portion of the feature and a portion of a second feature of the image can each be separately formed in a first sub-image of the plurality of sub-images and in a second sub-image of the plurality of sub-images on a region of the recording media corresponding to overlapping portions of the first sub-image and the second sub-image, and the method comprises forming the portion of the feature on the region in only one of the first sub-image and the second sub-image and forming the portion of the second feature on the region in both of the first sub-image and the second sub-image.

19. A method according to claim 1 wherein operating the print head to form the plurality of sub-images on the recording media comprises operating the print head to cause an image forming material to be transferred to the recording media.

20. A method according to claim 1 wherein operating the print head to form the plurality of sub-images on the recording media comprises operating the print head to emit radiation towards the recording media.

21. A method according to claim 1 comprising operating the print head to form the portion of the feature on a region of the recording media corresponding to overlapping portions of a first sub-image and a second sub-image of the plurality of sub-images.

22. A program product carrying a set of computer-readable signals comprising instructions which, when executed by a controller, cause the controller to:

provide image data to a print head which includes an arrangement of individually addressable marking elements adapted to form rows and columns of image elements on recording media in accordance with the image data, control the print head to form an image on the recording media with a plurality of sub-images; each of the sub-images corresponding to a part of the image data;

determine if a portion of a feature of the image that is to be formed on the recordable media with a row of the image elements intersects a boundary of a first sub-image of the plurality of sub-images that the portion of the feature is to be formed in;

determine if the portion of the feature has a size that is less than a selected feature comparison size value; and in the event that it is determined that the portion of the feature intersects the boundary and has a size that is less than the selected feature comparison size value, scrub data representing the portion of the feature from a first part of the image data corresponding to the first sub-image; adjust a second part of the image data corresponding to a second sub-image of the plurality of sub-images to include corresponding data representing the portion of the feature; and form the portion of the feature in the second sub-image.

23. A program product according to claim 22 wherein the instructions cause the controller to determine if the size of the portion of the feature along a direction that the row of image elements extends along is less than the selected feature comparison size value.

24. A program product according to claim 22 wherein the instructions cause the controller to:

control the print head to form the portion of the feature on a region of the recording media corresponding to overlapping portions of first sub-image and the second sub-image.

25. A program product according to claim 22 wherein the instructions cause the controller to:

control the print head to form the portion of the feature in the second sub-image such that the portion of the feature does not intersect a boundary of the second sub-image.

26. A program product according to claim 22 wherein in the event that it is determined that the portion of the feature intersects the boundary and has a size that is not less than the selected feature comparison size value, the instructions cause the controller to:

maintain the data representing the portion of the feature in the first part of the image data corresponding to the first sub-image;

adjust the second part of the image data corresponding to the second sub-image to include corresponding data representing the portion of the feature; and control the print head to form the portion of the feature in each of the first sub-image and the second sub-image.

* * * * *